(12) United States Patent
Peters

(10) Patent No.: US 6,974,145 B1
(45) Date of Patent: Dec. 13, 2005

(54) CONVEYANCE STABILIZATION ASSEMBLY

(76) Inventor: Martin B. Peters, 27901 Nieman, St. Clair Shores, MI (US) 48081

(*) Notice: Subject to any disclaimer, the term of this patent is extended or adjusted under 35 U.S.C. 154(b) by 0 days.

(21) Appl. No.: 10/785,788

(22) Filed: Feb. 24, 2004

(51) Int. Cl.⁷ .............................................. B62H 1/12
(52) U.S. Cl. ................................. 280/293; 280/293.1
(58) Field of Search .............................. 280/293, 294, 280/295, 296, 762, 763.1; 301/36.1

(56) References Cited

U.S. PATENT DOCUMENTS

| | | | | |
|---|---|---|---|---|
| 359,800 A | * | 3/1887 | McClintock | 211/20 |
| 473,959 A | * | 5/1892 | Quealy | 280/207 |
| 602,670 A | * | 4/1898 | Trapp | 280/296 |
| 1,576,048 A | * | 3/1926 | Hoffman | 211/20 |
| 2,793,877 A | | 5/1957 | Meier | |
| 3,642,305 A | | 2/1972 | Pawsat | |
| 4,230,046 A | * | 10/1980 | Smart | 105/95 |
| 4,595,213 A | | 6/1986 | Tsuchie | |
| 4,810,000 A | | 3/1989 | Saunders | |
| 5,133,569 A | | 7/1992 | Rieber et al. | |
| 5,454,579 A | * | 10/1995 | Chen | 280/205 |
| 5,564,726 A | | 10/1996 | Hearn et al. | |
| 6,286,849 B1 | | 9/2001 | Slattery | |

* cited by examiner

Primary Examiner—Avraham Lerner
(74) Attorney, Agent, or Firm—Law Offices of John Chupa & Associates, P.C.

(57) ABSTRACT

A stabilization assembly (10) and a methodology for reducing lateral movement of a conveyance. Particularly, the assembly (10) comprises two opposing wheel-to-frame connector portions (36, 40) which are coupled to a conveyance (100), a first pair of wheels (12) which are each coupled to a respective one of the wheel-to-frame connector portions (36, 40) at a first width, a pair of generally S-shaped wheel-to-wheel connector portions (28, 32) which are each removably coupled to a respective one of the wheel-to-frame connector portions (36, 40), and a second pair of wheels (14) which are each coupled to a respective one of the wheel-to-wheel connector portions (28, 32) at a second width which is larger than the first width.

17 Claims, 3 Drawing Sheets

CONVEYANCE STABILIZATION ASSEMBLY

FIELD OF THE INVENTION

The present invention generally relates to a conveyance stabilization assembly and, more particularly, a conveyance stabilization assembly having a pair of stabilization arms, each of which include two substantially identical and offset wheels, effective to provide conventional stabilization of a manual conveyance while concomitantly providing stabilization towards the center of gravity of the conveyance.

BACKGROUND OF THE INVENTION

Conventional conveyances (i.e., the term "conveyance" hereinafter refers to any two-wheel assembly that transports, carries, or propels an individual from one location to a remote location), such as and without limitation, scooters, bicycles, motorcycles, and the like, are oftentimes too complex to immediately operate or require special learned techniques (e.g., balance) for an individual to operate the conveyance safely. For example and without limitation, young individuals need to learn how to balance upon and operate a bicycle before the young individuals attempt to operate the bicycle without parental supervision, help, and/or guidance.

One well known methodology for training individuals, to operate a bicycle involves the coupling of "training wheels" to the rear tire of the bicycle, thereby widening the "stance" (i.e., the term "stance" hereinafter refers to a certain width which the opposing wheels of a set of "training wheels" are spaced apart) of the rear wheel of the bicycle, effective to lessen the potentiality of an operator of the bicycle to tip the bicycle over while riding the bicycle or to crash the bicycle because of excessive lateral or "side-to-side" movement of the bicycle (i.e., lateral movement of a bicycle is usually caused by an operator's lack of balance upon the bicycle).

Although this well known methodology for training an individual to ride a bike does desirably reduce lateral movement of the bicycle, it does suffer from one major drawback. For example and without limitation, the training wheels are disposed upon the back tire of the bicycle and even with the axle of the back wheel. In this manner, lateral movement of the bicycle is only reduced upon approximately one-quarter of the bicycle (i.e., the back tire of a bicycle is approximately one-quarter of the length of the entire bicycle, the frame portion of a bicycle is approximately one-half of the entire length of the bicycle, and the front tire of the bicycle is approximately one-quarter of the length of the entire bicycle), thereby leaving approximately three-quarters of the bicycle which continues to suffer from potential lateral movement.

There is therefore a need for an assembly which reduces the potentiality of lateral movement of at least one-half of a conveyance in a safe, cost effective, and convenient manner. There is also a need for a method for safely training an individual to ride/operate a conveyance in a manner which overcomes some or all of the previously delineated drawbacks of prior conveyance training methodologies.

SUMMARY OF THE INVENTION

A first non-limiting advantage of the present invention is that it provides an assembly which selectively and removably couples to a conveyance, thereby increasing stabilization of the conveyance in a manner which overcomes the previously delineated drawbacks of prior conveyance operating/training methodologies.

A second non-limiting advantage of the invention is that it provides an assembly which selectively and removably couples to a conveyance, thereby increasing stabilization of the conveyance in a manner which overcomes the previously delineated drawbacks of prior conveyance operating/training methodologies and, by way of example and without limitation, substantially reduces the potentiality for lateral movement of a conveyance.

A third non-limiting advantage of the present invention is that it provides a method which overcomes some or all of the previously delineated drawbacks of prior conveyance operating/training methodologies.

A fourth non-limiting advantage of the present invention is that it provides an assembly comprising: a pair of opposing connector portions; a first pair of wheels, each of the wheels being disposed upon a unique one of the pair of opposing connector portions at a first width; and a second pair of wheels, each of which are disposed upon a unique one of the pair of opposing connector portions at a second width which is larger than the first width.

A fifth non-limiting advantage of the present invention is that it provides a stabilization assembly for use with a conveyance, the stabilization assembly comprising: a pair of opposing connector portions; a first pair of wheels, each of the wheels being disposed upon a unique one of the pair of opposing connector portions on a plane which is perpendicular to the axis of symmetry of the conveyance, the first pair of wheels being disposed in close proximity to a back wheel of the conveyance and set apart at a first width; and a second pair of wheels, each of which are disposed upon a unique one of the pair of opposing connector portions on a plane which is perpendicular to the axis of symmetry of the conveyance, the second pair of wheels being disposed in close proximity to a center point of the conveyance and at a second width which is larger than the first width.

A sixth non-limiting advantage of the present invention is that it provides a method for reducing lateral movement of a conveyance, the method comprising the steps of: acquiring a conveyance having a front wheel, a rear wheel, and a frame portion having a center point; providing a pair of opposing connector portions; providing a first pair of wheels; providing a second pair of wheels; disposing each of the first pair of wheels upon a respective one of the pair of opposing connector portions; coupling the opposing connector portions and the first pair of wheels to the conveyance on a plane which is perpendicular to the axis of symmetry of the conveyance, the first pair of wheels being disposed in close proximity to the back wheel of the conveyance and set apart at a first width; and coupling each of the second pair of wheels to a respective one of the pair of opposing connector portions on a plane which is perpendicular to the axis of symmetry of the conveyance, the second pair of wheels being disposed in close proximity to the center point of the conveyance and at a second width which is larger than the first width.

These and other features, aspects, and advantages of the present invention will become apparent from a reading of the following detailed description of the preferred embodiment of the invention and by reference to the following drawings.

DETAILED DESCRIPTION OF THE PREFERRED EMBODIMENT OF THE INVENTION

The present invention may be understood more readily by reference to the following detailed description of preferred embodiments of the invention.

Before the present methods and apparatuses are disclosed and described, it is to be understood that the terminology used herein is for the purpose of describing particular embodiments only and is not intended to be limiting. It must be noted that, as used in the specification and the appended claims, the singular forms "a", "an", and "the" include plural referents unless the context clearly dictates otherwise.

Figure 1:
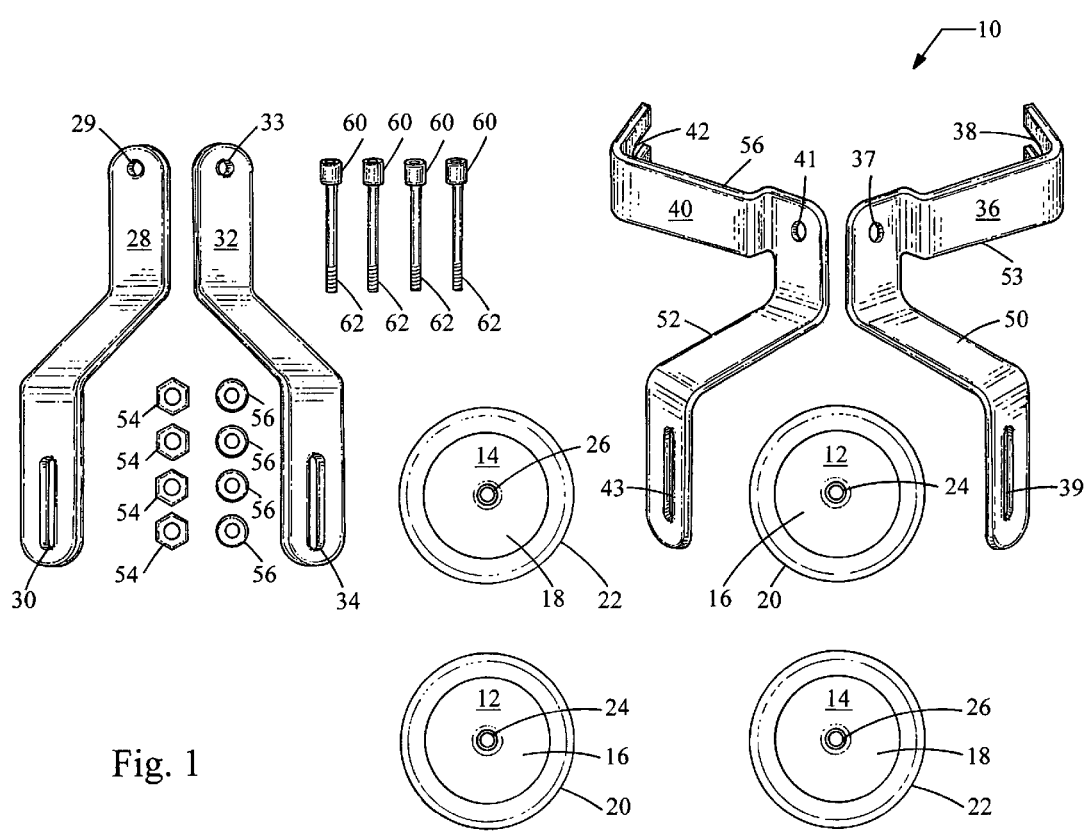
FIG. 1 is a disassembled partial perspective view of a conveyance stabilization assembly which is made in accordance with the teachings of the preferred embodiment of the invention.

Referring now to FIG. 1, there is shown a conveyance stabilization assembly 10 which is made in accordance with the teachings of the preferred embodiment of the invention. As shown, the assembly 10 includes a first pair of wheels 12, a second pair of wheels 14, a first generally "S-shaped" wheel-to-wheel connector bar 28, a second generally "S-shaped" wheel-to-wheel connector bar 32, a first wheel-to-frame connector bar 36, and a second wheel-to-frame connector bar 40. Particularly, the first pair of wheels 12 are substantially identical and each include a first rim portion 16, a first tire portion 20, and a first bearing portion 24 which is operatively disposed in the center of the first rim portions 16 (i.e., the rims 16 and tires 20 are concentric to the bearings 24). The second pair of wheels 14 are substantially identical to the first pair of wheels 12 and each include a second rim portion 18, a second tire portion 22, and a second bearing portion 26 which is operatively disposed in the center of the second rim portions 18 (i.e., the rims 18 and tires 22 are concentric to the bearings 26). It should be understood that the assembly 10 comprises two substantially similar and opposing portions which are coupled to a respective one side of a conveyance, such as bicycle 100.

The first generally S-shaped wheel-to-wheel connector bar 28 includes an aperture 29 which is formed through a first respective end and an elongated aperture 30 which formed through the remaining respective end. The second generally S-shaped wheel-to-wheel connector bar 32 includes an aperture 33 which is formed through a first respective end and an elongated aperture 34 which is formed through the remaining respective end.

The first wheel-to-frame connector portion 36 includes a first generally S-shaped portion 50, which is substantially similar to the second wheel-to-wheel connector portion 32, and a generally "U-shaped" portion 53. The first generally S-shaped portion 50 includes an aperture 37 formed through a first respective end and an elongated aperture 39 formed through a second respective end (i.e., substantially similar to the apertures 29, 33, 30, 34, of the first and second wheel-to-wheel connector portions 28, 32). The generally U-shaped portion 53 includes a semi-circular recessed end 38 which is adapted to receive a portion of a conventional conveyance, such as and without limitation, bicycle 100. It should be appreciated that the remaining end of the generally U-shaped port-ion 53 is shared or integrally formed with the first respective end of the generally S-shaped portion 50 (i.e., the end of the S-shaped portion 50 which includes the aperture 37).

The second wheel-to-frame connector portion 40 includes a first generally S-shaped portion 52, which is substantially similar to the first wheel-to-wheel connector portion 28, and a generally "U-shaped" portion 56. The first generally S-shaped portion 52 includes an aperture 41 formed through a first respective end and an elongated aperture 43 formed through a second respective end (i.e., substantially similar to the apertures 29, 33, 30, 34, of the first and second wheel-to-wheel connector portions 28, 32). The generally U-shaped portion 56 includes a semi-circular recessed end 42 which is adapted to receive a portion of a conventional conveyance, such as and without limitation, bicycle 100. It should be appreciated that the remaining end of the generally U-shaped portion 56 is shared or integrally formed with the first respective end of the generally S-shaped portion 52 (i.e., the end of the S-shaped portion 52 which includes the aperture 41).

Figure 2:
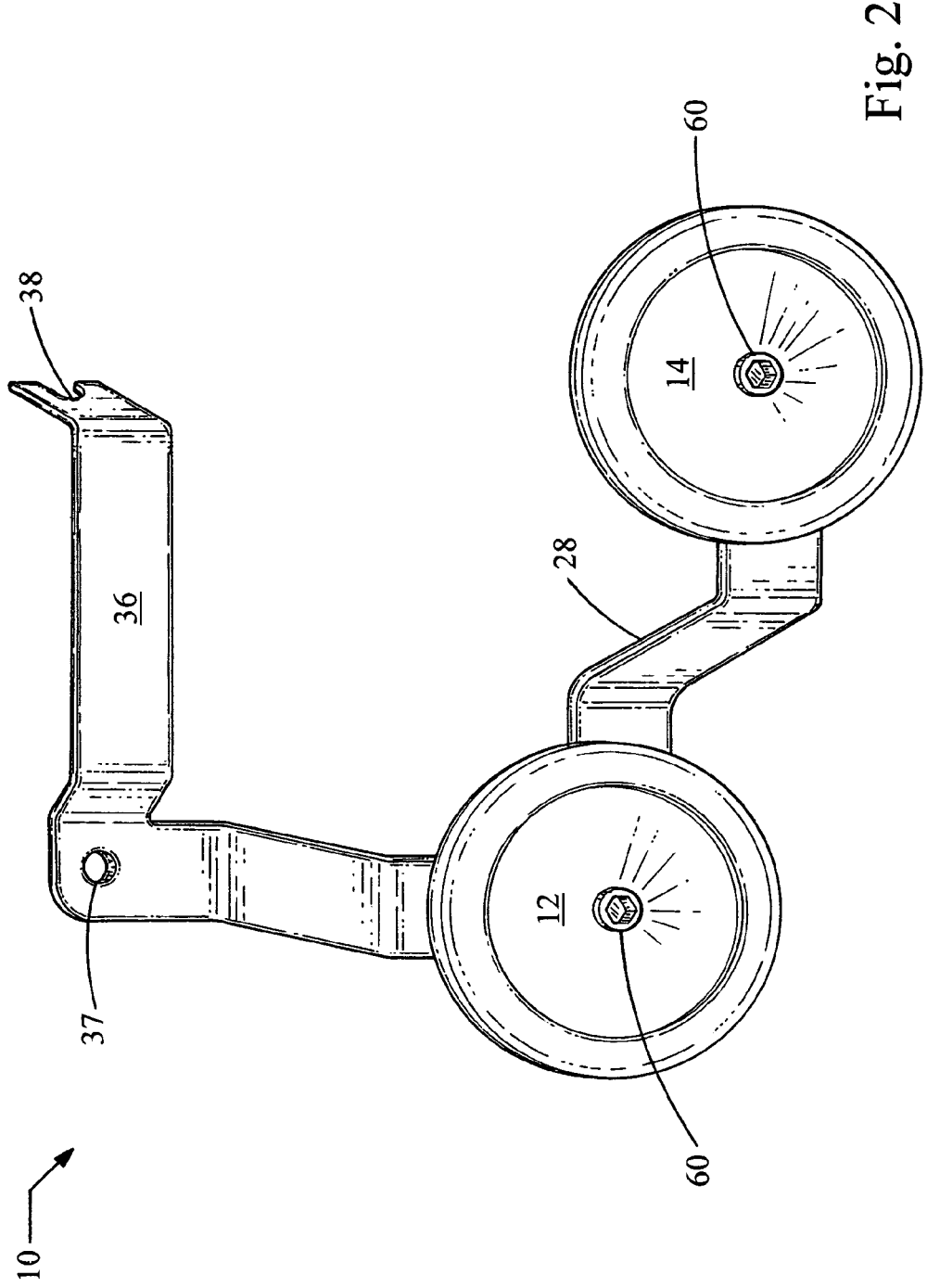
FIG. 2 is an assembled partial perspective view of the conveyance stabilization assembly which is shown in FIG. 1.

In assembly and operation and, as is shown best in FIG. 2, the first wheel-to-wheel connector 28 is adapted to be coupled to the first wheel-to-frame connector 36 by use of one of the plurality of conventional threaded connector portions 60. Particularly, the aperture 29 of the first wheel-to-wheel connector 28 is aligned with the elongated aperture 39 of the first wheel-to-frame connector 36. Next, the bearing portion 24 of a respective wheel 12 of the first pair of wheels 12 is aligned with the two aligned apertures 29 and 39. Upon aligning the bearing portion 24 with the apertures 29, 39, a respective one of the conventional threaded fastener portions 60 is disposed through the bearing portion 24, through the aperture 29, and through the aperture 39. Next, a respective one of the plurality of conventional washers 56 is disposed upon the conventional threaded fastener 60 and a respective one of the plurality of conventional nuts 54 is disposed upon and threadingly engaged with the threading 62 of the fastener 60, thereby securely coupling the first wheel-to-wheel connector 28 to the first wheel-to-frame connector 36 and a respective one of the first pair of wheels 12 to the first wheel-to-wheel connector 28. It should be appreciated that the first wheel-to-wheel connector 28 is coupled to the first wheel-to-frame connector at a ninety-degree angle (i.e., the first wheel-to-wheel connector 28 is perpendicular to the first wheel-to-frame connector 36).

Next, a respective one of the second pair of wheels 14 is coupled to the remaining end of the first wheel-to-wheel connector 28. This is accomplished by aligning the bearing portion 26 with the elongated aperture 30 and disposing a respective one of the remaining conventional threaded fastening portions 60 through the bearing portion 26 and through the aperture 30. Next, a respective one of the remaining conventional washers 56 is disposed upon the fastener 60 and a remaining one of the conventional nuts 54 is disposed upon the fastener 60 and threadingly engaged with the threading 62, thereby coupling the wheel 14 to the wheel-to-wheel connector 28. In this manner, a first stabilization assembly 10 of the pair of stabilization assemblies 10 has been assembled.

Now, the remaining second stabilization assembly 10 is assembled. That is, the second wheel-to-wheel connector 32 is adapted to be coupled to the second wheel-to-frame connector 40 by use of one of the plurality of conventional threaded connector portions 60. Particularly, the aperture 33 of the second wheel-to-wheel connector 32 is aligned with the elongated aperture 43 of the second wheel-to-frame connector 40. Next, the bearing portion 24 of the remaining respective wheel 12 of the first pair of wheels 12 is aligned with the two aligned apertures 33, 43. Upon aligning the bearing portion 24 with the apertures 33, 43, a respective one of the conventional threaded fastener portions 60 is disposed through the bearing portion 24, through the aperture 33, and through the aperture 43. Next, a respective one of the plurality of conventional washers 56 is disposed upon the conventional threaded fastener 60 and a respective one of the plurality of conventional nuts 54 is disposed upon and threadingly engaged with the threading 62 of the fastener 60, thereby securely coupling the second wheel-to-wheel connector 32 to the second wheel-to-frame connector 40 and the remaining respective first wheel 12 of the first pair of wheels 12 to the second wheel-to-wheel connector 32. It should be appreciated that the second wheel-to-wheel connector 32 is coupled to the second wheel-to-frame connector 40 at a ninety-degree angle (i.e., the second wheel-to-wheel connector 32 is perpendicular to the second wheel-to-frame connector 40).

Next, the remaining respective one of the second pair of wheels 14 is coupled to the remaining end of the second wheel-to-wheel connector 32. This is accomplished by aligning the bearing portion 26 with the elongated aperture 34 and disposing a respective one of the remaining conventional threaded fastening portions 60 through the bearing portion 26 and through the aperture 34. Next, a respective one of the remaining conventional washers 56 is disposed upon the fastener 60 and a remaining one of the conventional nuts 54 is disposed upon the fastener 60 and threadingly engaged with the threading 62, thereby coupling the wheel 14 to the wheel-to-wheel connector 32. In this manner, the remaining stabilization assembly 10 of the pair of stabilization assemblies 10 has been assembled.

Figure 3:
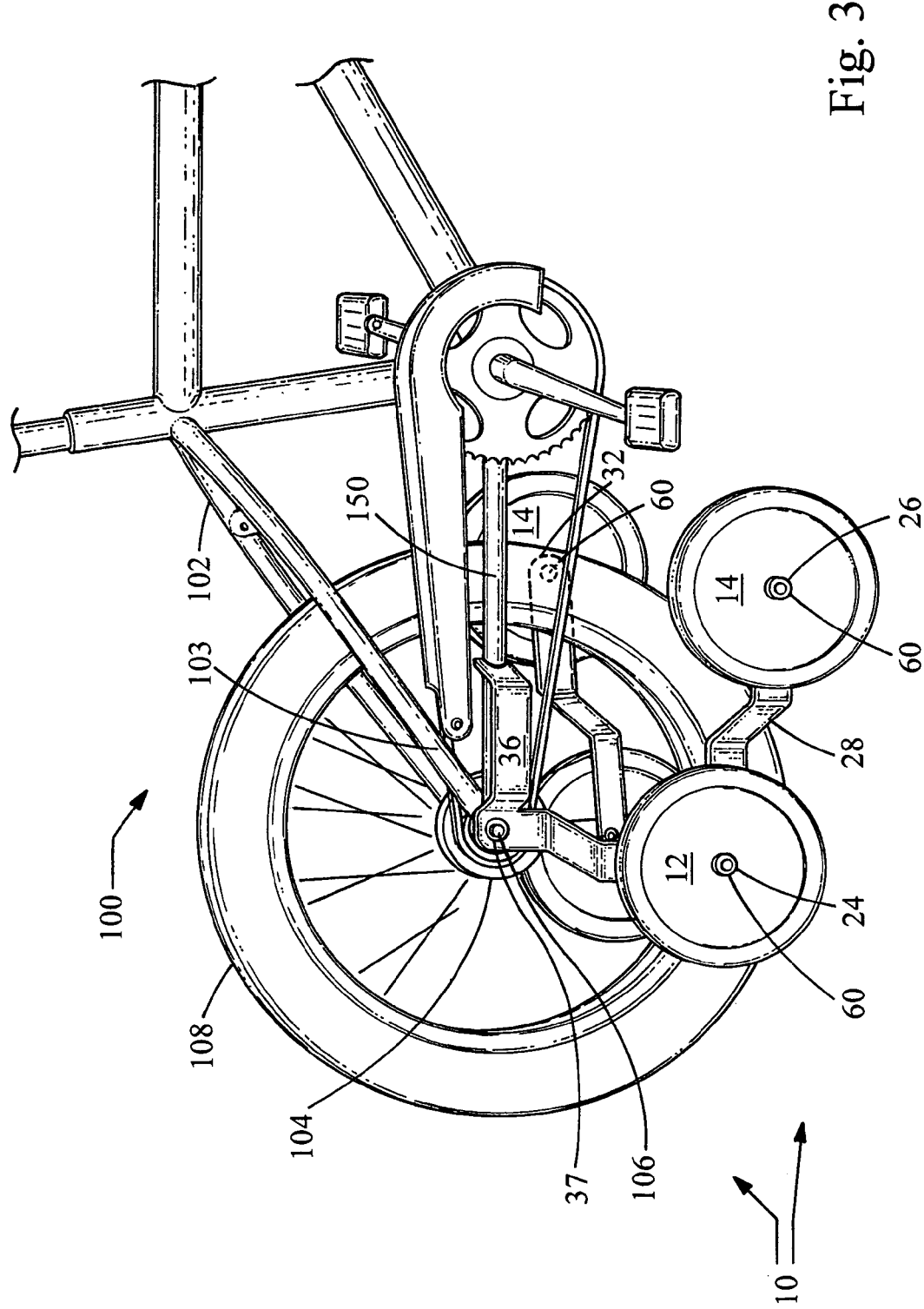
FIG. 3 is a partial perspective view of the conveyance stabilization assembly which is shown in FIG. 2 in an assembled relationship with a conventional conveyance.

As is best shown in FIG. 3, the geometrical configuration of the generally S-shaped wheel-to-wheel connectors 28, 32 give the pair of wheels 14 a wider "stance" than the pair of wheels 12, thereby increasing the stability of the bicycle 100 and an operator of the bicycle 100. In this manner, the assembly 10 provides greater stability than conventional stabilization assemblies not only by providing a second pair of wheels, but by providing a second set of wheels which are set further apart than the wheels 12, thereby increasing the stance of the bicycle 100, which substantially prevents any side-to-side movement of the bicycle 100 or any tipping over of the bicycle 100. That is, the first pair of wheels 12 are each disposed upon a respective one of the first and second opposing wheel-to-wheel connector portions 28, 32 on a plane which is perpendicular to the axis of symmetry of the bicycle 100, wherein the first pair of wheels 12 are disposed in close proximity to a back wheel of said conveyance and set apart at a first width (e.g., approximately sixteen inches apart when coupled to a conveyance). The second pair of wheels 14 are each disposed upon a respective one of the first and second pair of opposing wheel-to-frame connector portions 36, 40 on a plane which is perpendicular to the axis of symmetry of the conveyance, wherein the second pair of wheels 14 are disposed in close proximity to a center point of the bicycle 100 and at a second width which is larger than the first width of the first pair of wheels 12 (e.g., the second pair of opposing wheels 14 are set apart at approximately twenty-two to twenty-six inches).

Referring now to FIG. 3, there is shown one non-limiting example of the stabilization assembly 10 in an assembled relationship with a bicycle 100. As shown, the conventional bicycle 100 includes a frame portion 102 having crank-to-axle bar 150, an axle portion 104, and an axle bolt 106 which movably contains a conventional rear tire 108 between conventional rear-wheel forks 103 of the frame portion 102. In order to couple the assembly 10 to the bicycle 100, the axle bolt 106 must be removed from the bicycle 100. After removing the axle bolt 106, the generally U-shaped portion 53 of the wheel-to-frame connector 36 is aligned with the crank-to-axle bar 150, such that the semi-circular recessed portion 38 receives the crank-to-axle bar 150 and such that the aperture 37 is aligned with the aperture which held the axle bolt 106. Next, the axle bolt 106 is disposed through the aperture 37 and partially inserted through the axle portion 14 (i.e., partially disposed through the axle in a manner that the axle bolt 106 does not protrude from the other opposing conventional frame fork 103). In this manner, the remaining generally U-shaped portion 56 of the wheel-to-frame connector 40 may be disposed upon the opposing crank-to-axle bar 150 such that the semi-circular recessed portion 42 receives the remaining crank-to-axle bar 150, and such that the aperture 41 is aligned with the aperture that contains the axle bolt 106. In this manner, the axle bolt 106 may be disposed through the aperture 41 and fastened in a conventional manner (e.g., a conventional lock washer and a conventional threaded nut may be threadingly engaged with the axle bolt 106, such that the axle bolt is securely containing the assembly 10 as well as the rear wheel 108.

It should be appreciated that each respective wheel 12, 14 of the pair of wheels 12, 14 are now operatively disposed on a respective side of the bicycle. Moreover, each respective wheel 14 of the pair of wheels 14 are disposed in general alignment or in close proximity to the center of the bicycle 100 (i.e., on either side of the seat), thereby providing stabilization to the rear wheel 108 of the bicycle 100 (by use of the pair of wheels 12) while concomitantly providing stabilization to the center of the bicycle 100 or the operator of the bicycle 100 (i.e., the wheels 14 substantially reduce lateral or side-to-side movement of the seat portion of a conventional bicycle 100, thereby substantially preventing side-to-side movement of the operator of the bicycle 100).

It should further be appreciated that, in this manner, the second pair of wheels 14 and the first and second wheel-to-wheel connectors 28, 32 may be selectively removed, thereby leaving only the wheels 12. In this manner, an individual may utilize the assembly 10 until such time that the individual learns to balance upon the seat of a conventional bicycle 100 and, upon learning to balance upon the seat (i.e., by use of the wheels 14 and the wheel-to-wheel connectors 28, 32), the individual may selectively remove the assembly 10 or just remove the wheel-to-wheel connectors 28, 32, thereby leaving only the wheels 12. The individual may then learn to balance the back wheel 108 by use of only the wheels 12 and, upon learning to balance the back wheel 108, the individual may then remove the wheel-to-frame connectors 36, 40, thereby removing the assembly 10.

It should be understood that this invention is not limited to the exact construction or embodiments listed and described, but that various changes may be made without departing from the spirit and scope of the invention.

What is claimed is:

1. An assembly comprising:
   a pair of opposing connector portions;
   a first pair of wheels, each of said wheels being disposed upon a unique one of said pair of opposing connector portions at a first width; and
   a second pair of wheels, each of which are disposed upon a unique one of said pair of opposing connector portions at a second width which is larger than said first width, and wherein said pair of opposing connectors each further comprise:
   a wheel-to-frame connector portion; and
   a generally S-shaped wheel-to-wheel connector portion which is removably coupled to said wheel-to-frame connector portion.

2. The assembly of claim 1 wherein each of said wheel-to-frame connector portions further comprise:
   a generally S-shaped portion which is substantially similar to a respective one of said generally S-shaped wheel-to-wheel connector portions; and
   a generally U-shaped portion which is coupled to said generally-S-shaped portion, wherein said generally U-shaped portion extends from said generally S-shaped portion and terminates in a semi-circular recessed portion.

3. The assembly of claim 2 wherein each of said wheel-to-frame connector portions further include a first generally circular aperture which is formed through a respective end of said wheel-to-frame connector portion and a second aperture which is formed through a remaining respective end of said wheel-to-frame connector portion.

4. The assembly of claim 3 wherein each of said wheel-to-wheel connector portions further include a first generally circular aperture which is formed through a respective end of said wheel-to-wheel connector portion and a second aperture which is formed through a remaining respective end of said wheel-to-wheel connector portion.

5. The assembly of claim 4 wherein said second apertures of said wheel-to-wheel and said wheel-to-frame connector portions are elongated.

6. The assembly of claim 5 wherein said first pair of wheels are each disposed upon a unique one of said pair of wheel-to-frame connector portions on a plane which is perpendicular to the axis of symmetry of a conveyance, said first pair of wheels being disposed in close proximity to a back wheel of said conveyance, and wherein said second pair of wheels are disposed upon a unique one of said pair of opposing wheel-to-wheel connector portions on a plane which is perpendicular to the axis of symmetry of said conveyance, said second pair of wheels being disposed in close proximity to a center point of said conveyance and at a second width which is larger than said first width.

7. The assembly of claim 6 wherein said conveyance comprises an assembly having a back wheel, a front wheel, a frame portion which is disposed between said back and said front wheel, and a seat portion which is disposed in close proximity to a center point of said frame portion.

8. A stabilization assembly for use with a conveyance, said stabilization assembly comprising:
   a pair of opposing connector portions;
   a first pair of wheels, each of said wheels being disposed upon a unique one of said pair of opposing connector portions on a plane which is perpendicular to the axis of symmetry of said conveyance, said first pair of wheels being disposed in close proximity to a back wheel of said conveyance and set apart at a first width; and
   a second pair of wheels, each of which are disposed upon a unique one of said pair of opposing connector portions on a plane which is perpendicular to the axis of symmetry of said conveyance, said second pair of wheels being disposed in close proximity to a center point of said conveyance and at a second width which is larger than said first width.

9. The assembly of claim 8 wherein said pair of opposing connectors each further comprise:
   a wheel-to-frame connector portion; and
   a generally S-shaped wheel-to-wheel connector portion which is removably coupled to said wheel-to-frame connector portion.

10. The assembly of claim 9 wherein each of said wheel-to-frame connector portions further comprise:
    a generally S-shaped portion which is substantially similar to a respective one of said generally S-shaped wheel-to-wheel connector portions; and
    a generally U-shaped portion which is coupled to said generally-S-shaped portion, wherein said generally U-shaped portion extends from said generally S-shaped portion and terminates in a semi-circular recessed portion.

11. The assembly of claim 10 wherein each of said wheel-to-frame connector portions further include a first generally circular aperture which is formed through a respective end of said wheel-to-frame connector portion and a second aperture which is formed through a remaining respective end of said wheel-to-frame connector portion.

12. The assembly of claim 11 wherein each of said wheel-to-wheel connector portions further include a first generally circular aperture which is formed through a respective end of said wheel-to-wheel connector portion and a second aperture which is formed through a remaining respective end of said wheel-to-wheel connector portion.

13. The assembly of claim 12 wherein said second apertures of said wheel-to-wheel and said wheel-to-frame connector portions are elongated.

14. The assembly of claim 13 wherein said conveyance comprises an assembly having a back wheel, a front wheel, a frame portion which is disposed between said back and said front wheel, and a seat portion which is disposed in close proximity to a center point of said frame portion.

15. A method for reducing lateral movement of a conveyance, said method comprising the steps of:
    acquiring a conveyance having a front wheel, a rear wheel, and a frame portion having a center point;
    providing a pair of opposing connector portions;
    providing a first pair of wheels;
    providing a second pair of wheels;
    disposing each of said first pair of wheels upon a respective one of said pair of opposing connector portions;
    coupling said opposing connector portions and said first pair of wheels to said conveyance on a plane which is perpendicular to the axis of symmetry of said conveyance, said first pair of wheels being disposed in close proximity to said back wheel of said conveyance and set apart at a first width; and
    coupling each of said second pair of wheels to a respective one of said pair of opposing connector portions on a plane which is perpendicular to the axis of symmetry of said conveyance, said second pair of wheels being disposed in close proximity to said center point of said conveyance and at a second width which is larger than said first width.

16. The method of claim 15 wherein said step of providing a pair of opposing connector portions further comprises the steps of:
    providing a first generally S-shaped wheel-to-wheel connector portion;
    providing a second generally S-shaped wheel-to-wheel connector portion;
    providing a first wheel-to-frame connector portion;
    providing a second wheel-to-frame connector portion;
    removably coupling said first wheel-to-wheel connector portion to said first wheel-to-frame portion at a ninety degree angle; and
    removably coupling said second wheel-to-wheel connector portion to said second wheel-to-frame portion at a ninety degree angle.

17. The method of claim 16 further comprising the steps of:
    forming a semi-circular recessed portion in each of said wheel-to-frame connector portions; and
    coupling said wheel-to-frame connector portions to said back wheel of said conveyance, such that said frame portion is received by said semi-circular recessed portions of said wheel-to-frame connector portions.

* * * * *